INVENTORS.
Harry A. Gill
By Melvin W. Redmond, Jr.

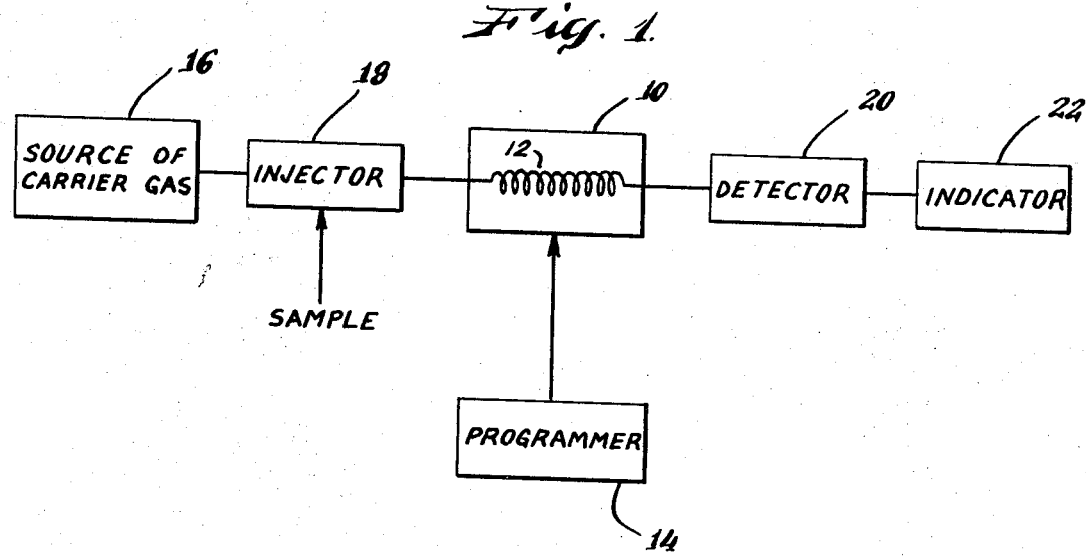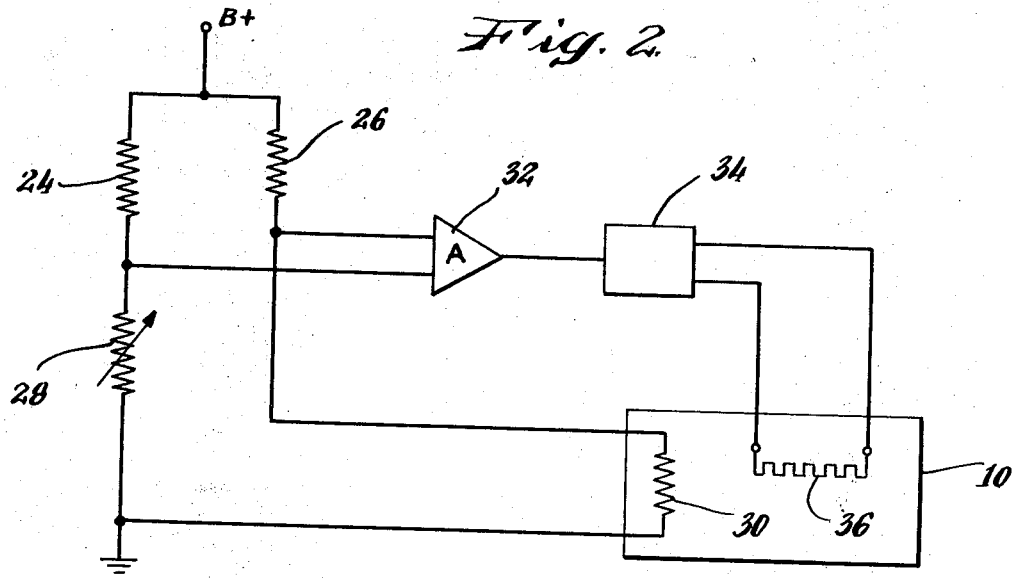

ATTORNEY.

United States Patent Office 3,531,700
Patented Sept. 29, 1970

3,531,700
VARIABLE SPEED DRIVE ARRANGEMENT FOR AN ANALYTICAL INSTRUMENT
Harry A. Gill, Ridgefield, and Melvin W. Redmond, Jr., West Redding, Conn., assignors to The Perkin-Elmer Corporation, Norwalk, Conn., a corporation of New York
Filed Feb. 1, 1967, Ser. No. 613,220
Int. Cl. H02p 5/46
U.S. Cl. 318—8　　　　　　　　　　　　　　5 Claims

ABSTRACT OF THE DISCLOSURE

A variable speed drive arrangement in an analytical instrument includes first and second stepping motors coupeld to input shafts of a mechanical differential. An output shaft of the differential is coupled to a driven element of the instrument. A motor energizing circuit means is adapted for providing a plurality of output voltages of different frequencies which are derived from a reference frequency and includes means for selectively applying voltages of desired frequency to the individual motors.

---

This invention relates to analytical instruments. The invention relates more particularly to variable speed drive arrangements employed with analytical instruments.

It is often desirable to provide a variable speed drive arrangement for performing various functions in analytical instruments. In some instruments the variable speed drive is utilized for varying the temperature of a component over a range of temperatures in a predetermined manner. In a chromatograph, for example, the characteristics of a separation column are dependent in part upon the temperature of the column and improved separations for a particular sample under analysis can be attained by temperature programming the column. Temperature programming is accomplished by housing the column in an environmental chamber and automatically altering the temperature of the chamber at an incremental rate for a period of time. In order to be of analytical value, the programming should be performed with a relatively high degree of accuracy. In addition, in order to be useful with different test samples, means are generally provided for permitting the instrument operator to select different programming rates.

In a known variable speed drive employed with a temperature programming arrangement, the environmental chamber is thermostatted by circuit means including a potentiometer. A stepping motor is mechanically coupled to a rotable member of the potentiometer for varying the potentiometer resistance and thereby causing the temperature variations. Accuracy of programming is determined in large measure by the manner in which the motor is energized. One motor energizing arrangement includes a multiple stage electronic counter having as an input signal, a voltage of power line frequency. An output voltage having a desired frequency derived from the line voltage frequency is selectively coupled from a stage of the counter to a power amplifier. While this programming arrangement utilizes the power line frequency as a relatively accurate reference source for establishing the motor drive rates and for providing differing programmed rates, it has several limitations. The number of differing drive rates is determined by the number of counter stages. For example, a four stage binary counter would provide rates of 30 cps., 15 cps., 7.5 cps. and 3.75 cps. At times various analyses are better accomplished by proframming at rates intermediate the rates which can be provided by the counter. In addition, the stepping motion of the motor is coupled via a drive train to the potentiometer shaft. The usual requirements for engineering tolerances and freedom from binding in such an arrangement is accompanied by undesired backlash. This backlash further tends to reduce overall accuracy of the programmed arrangement.

Accordingly, it is an object of the present invention to provide an analytical instrument having an improved variable speed drive arrangement.

Another object of the invention is to provide an analytical instrument having a temperature programming arrangement including an improved variable speed drive arrangement.

Another object of the invention is to provide a temperature programming arrangement in an analytical instrument which is adapted for providing a programming rate intermediate the frequencies provided by circuits dependent upon line frequency.

A further object of the invention is to provide a temperature programming arrangement having reduced backlash in a motor drive train.

The termination of a temperature program generally requires that the potentiometer be returned to a resistance value corresponding to the desired initial oven temperature and that associated control point indicators be accordingly repositioned. In prior programming arrangements, stepping motors have included windings for causing the motor to rotate in opposite directions when properly energized. An arrangement of this type generally introduces additional undesirable backlash.

A further object of the invention is to provide a reversible temperature programming arrangement allowing the use of stepping motors having drive shafts adapted for rotation in one direction.

In accordance with features of the present invention, a variable speed drive arrangement for an analytical instrument includes a driven element which is mechanically coupled to an output shaft of a mechanical differential. First and second stepping motors are coupled respectively to first and second driven input shafts of the mechanical differential. A circuit means for energizing the motors has an input signal, a voltage derived from a power line source. This circuit means is adapted to provide a plurality of output voltages of different frequencies and includes means for selectively applying voltages of desired frequency to the individual motors.

These and other objects and features of the present invention will become apparent with reference to the following specification and drawings wherein:

FIG. 1 is a diagram in block form illustrating the general arrangement of a chromatographic analytical instrument;

FIG. 2 is a circuit diagram partly in block form illustrating a circuit arrangement for thermostating an environmental chamber of the instrument of FIG. 1;

Figure 3:
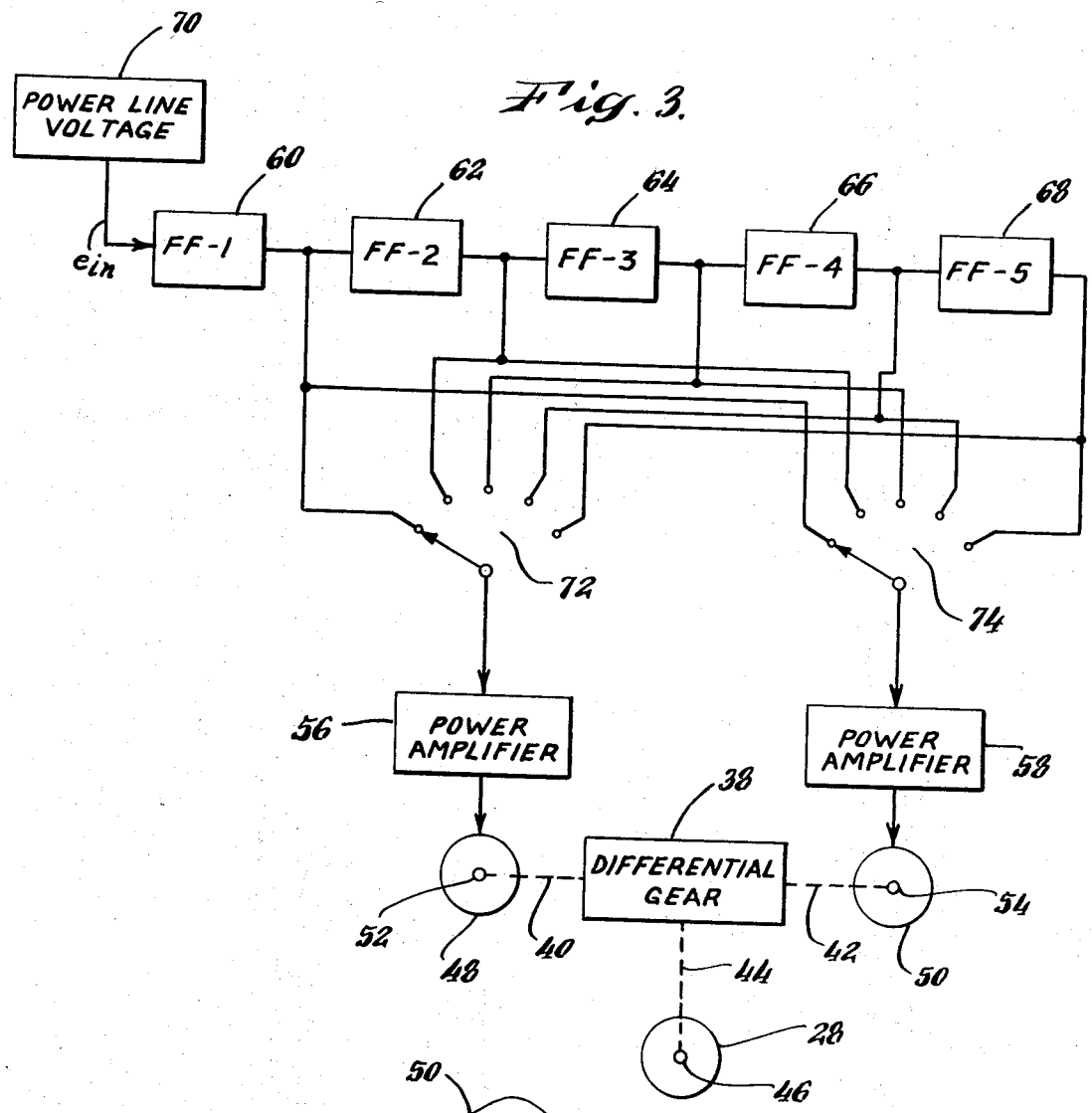
FIG. 3 is a diagram in block form illustrating a variable speed drive arrangement constructed in accordance with features of the present invention.

Referring now to FIG. 1, an analytical instrument comprises a chromatograph which is shown to include an environmental chamber 10 housing a chromatographic separation column 12. As indicated in greater detail hereinafter, the temperature of the environmental chamber is varied by temperature programming means indicated generally as 14. Carrier gas is coupled to the column 12 from a source 16 via suitable tubulation and through an injector block 18 wherein a sample is injected into the flowing carrier gas stream. The separated components of the sample elute successively in time and are sensed by a detector 20 which provides an output electrical signal indicative of the concentration of the different components in the sample. This electrical signal is applied to an indicating means 22 which may comprise a chart recorder for generating a chromatogram.

An arrangement for controlling the temperature of the environmental chamber 10 is illustrated in FIG. 2. This is a proportional type temperature control arrangement. A bridge circuit of the arrangement includes balance resistors 24 and 26, a temperature programming potentiometer 28 which is of the type having a rotatable shaft for varying the resistance thereof in accordance with different positioning of the shaft. A temperature sensing resistor 30 such as a thermistor is also connected in the bridge circuit and is positioned within the environmental chamber 10 for providing a resistive indication of the temperatutre within the chamber. Unbalance in the bridge circuit is detected by a differential amplifier 32 which generates and applies a control signal to an energizing means 34 for controlling the application of electrical energy to a heating coil 36, also positioned within the environmental chamber 10. In operation, a balanced bridge circuit condition inhibits amplifier output and the heater coil 36 is deenergized. The temperature of the chamber 10 is controlled at a point determined by the setting of the potentiometer 28. If the temperature varies from the control point, an error signal is developed at the bridge terminals. This error signal is amplified by amplifier 32, causing application of power to heater 36 in an amount sufficient to restore balance in the bridge circuit and thereby the original temperature point. The resistance of potentiometer 28 is varied to cause a variation over the desired temperature range.

In accordance with a feature of the present invention, a temperature programming arrangement for use with the instrument is illustrated in FIG. 3 and includes a mechanical differential 38 having first and second input shafts 40 and 42 respectively. An output shaft 44 is provided and is coupled to a drive shaft 46 of a driven element comprising the potentiometer 28 (FIG. 2) for varying the resistance of the potentiometer. One such form of mechanical differential is a gear type differential. First and second stepping motors 48 and 50, respectively, are provided. Drive shafts 52 and 54 of these motors are coupled respectively to the input drive shafts 40 and 42 of the differential 38. This coupling is provided by means, indicated generally as 53 and 55. The coupling is adapted for driving the input shafts 40 and 42 at the motor shaft rate or alternatively, a speed change may be provided as indicated hereinafter.

Energization windings of the motors 48 and 50, not illustrated, are excited by circuit means including power amplifiers 56 and 58, respectively. A circuit arrangement shown to be a five stage binary counter including the stages 60, 62, 64, 66 and 68 is provided for generating a plurality of output voltages each having a frequency derived from a power line voltage frequency. The power line source is represented as 70. As indicated previously frequency of a power line voltage is relatively stable and serves as an accurate reference frequency for determining the operating rates of the motors 52 and 54. A voltage ($e_{in}$) at power line frequency is applied as an input voltage to the first stage 60 of the counter, and, in a well known manner, the output voltage of each stage has a frequency equal to the frequency of the corresponding input frequency divided by the radix of the system. For example, in a binary counter each of the stages 60 through 68 comprises a flip flop circuit having two stable states and when the input frequency of the voltage ($e_{in}$) to the stage 60 is 60 Hz., for example, then the output frequency of the stages 60, 62, 64, 66 ad 68 is, respectively, 30, 15, 7½, 3.75, and 1.875, Hz. per second. Switching means comprising the rotary switches 72 and 74 are provided for selectively coupling the output of these stages to the power amplifiers 56 and 58. It is seen that the input to each of the power amplifiers 56 and 58 is selected to be of the same frequency or of different frequencies. Accordingly, the motors are excited at the same or at differing frequencies and a relatively large number of speeds for the differential output shaft 44 are provided.

In operation, the instrument operator selects a desired programming rate by setting the switches 72 and 74 in a manner for providing that the output shaft 44 of the mechanical differential 38 rotates in a desired direction and at a desired rate. The mechanical differential operates in a known manner whereby the rate of rotation of the output shaft 44 is proportional to the rate of rotation of the input shafts 40 and 42. When the switches 72 and 74 are selected to provide input voltages of the same frequency to the power amplifiers 56 and 58 and speed changing means are included in the shaft coupling means, then the shaft 44 will rotate at an angular velocity $\varpi_1$. When the switches are selected for providing an input voltage to one power amplifier having a frequency differing from the frequency of the voltage applied to the other power amplifier, then the motor drive shafts 52 and 54 will rotate at different rates and the output angular velocity of the shaft 44 will be greater or lesser than the value $\varpi_1$ or, may reverse in direction.

Figure 4:
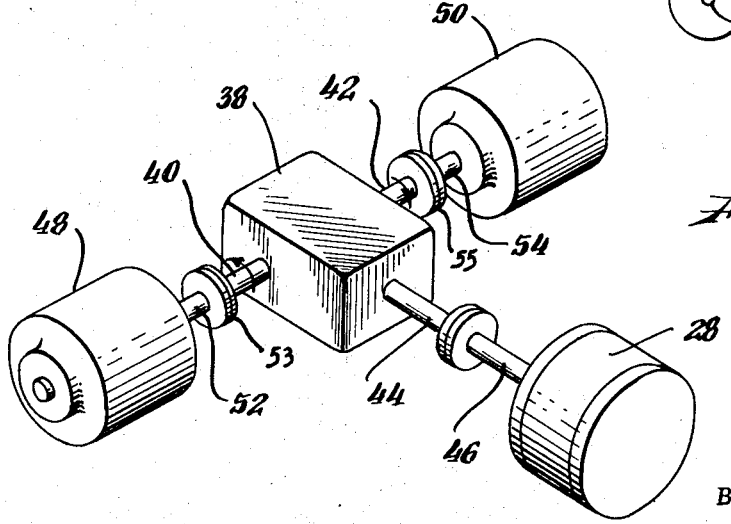
FIG. 4 is a perspective view of an embodiment of the motor and mechanical differential drive arrangement employed in the present invention.

A perspective view of the arrangement of the motors and the mechanical differential means is illustrated in FIG. 4. The motors 48 and 50 comprise a known form of stepping motor having rotors which step in response to a pulsating excitation and are adapted to be rotated in a single direction. The positioning of the drive shafts of the motors 48 and 50 in the arrangement shown in FIG. 4 cause these shafts to rotate in mutually different directions. Accordingly, as force is maintained on the drive train, the amount of backlash existing in the drive system is substantially reduced over prior arrangements. Then accuracy of a temperature programming having such a drive arrangement is thereby increased.

Although the excitation of the stepping motors at relatively differing frequencies advantageously provides a relatively large number of drive rates, additional line speeds may be provided in accordance with the present invention by providing a speed changing means for intercoupling the motors and the drive differential input shafts. For example, when both motors are excited by voltages at the same frequency, then the speed changing means will cause the input shafts of the differential to rotate at different rates. As another alternative, the motors themselves are constructed in a manner for operating at different motor shaft speeds when excited at the same frequency. A typical speed changing means between the motor output shaft and differential input shaft comprises gear trains having differing gear ratios. The shaft coupling means 53 and 54 of FIG. 4 may include such speed changing means.

In one form of the apparatus, shown in FIG. 3, the following components which are not construed to limit the invention in any respect, provided satisfactory performance: mechanical differential 38—Insco Corp. Model 00490; and, stepping motor 48, 50—Hayden Co., Model 45-100.

Thus, a variable speed drive arrangement employing a power line frequency as a reference source is described. The drive is adapted for providing drive at rates which are derived from the power line frequency; which reduces backlash in the drive system, and, which employs a stepping motor of a type requiring windings adapted for causing the motor shaft to rotate in a single direction.

While I have illustrated and described a particular embodiment of my invention, it will be understood that various modifications may be made therein without departing from the spirit of the invention and the scope of the appended claims.

We claim:
1. A variable speed drive arrangement comprising:
 a mechanical differential means having first and second power input drive shafts and an output shaft;
 a driven utility element having a drive shaft coupled to said output shaft;

first and second electrical motor means coupled respectively to said first and second input drive shafts for operating said drive shafts;

a single counter circuit having a plurality of output stages and associated output terminals for providing a plurality of outputs each of different frequency in response to an input signal of constant frequency applied to said counter;

means for applying an input signal of constant frequency to said counter; and means including a manually operated switching circuit for selectably coupling each of said motors to one of the plurality of output terminals of said counter.

2. The apparatus of claim 1 wherein said constant frequency comprises a power line frequency.

3. The apparatus of claim 1 including rotatable speed changing coupling means for intercoupling said motors and said differential input shafts.

4. The apparatus of claim 1 wherein said counter includes a plurality of stages and said switching means are provided for selectively applying the output of said stages to said motor means.

5. An analytical instrument having a temperature programming arrangement including:

an environmental chamber;

a thermostat circuit including an adjustable electrical impedance having a drive shaft and adapted to vary the temperature of said chamber in accordance with movement of said drive shaft;

mechanical differential means having first and second input shafts and an output shaft;

first and second stepping motors each having a drive shaft;

means for coupling the drive shaft of said first and second motors to said first and second mechanical differential input shafts respectively and for coupling said differential output shaft to said electrical impedance shaft;

a single counter circuit having a plurality of output stages and associated output terminals for providing a plurality of outputs each of different frequency in response to an input signal of constant frequency applied to said counter;

means for applying an input signal of constant frequency to said counter; and means including a manually operated switching circuit for selectably coupling each of said motors to one of the plurality of output terminals of said counter.

References Cited
UNITED STATES PATENTS

| | | | |
|---|---|---|---|
| 2,523,503 | 9/1950 | Fairbanks | 318—8 |
| 2,537,427 | 1/1951 | Seid et al. | 318—28 |
| 3,146,386 | 8/1964 | Gerber | 318—8 |
| 3,231,801 | 1/1966 | Lang | 318—8 |
| 3,268,785 | 8/1966 | Gerber et al. | 318—8 |
| 3,446,099 | 5/1969 | Lesher | 318—8 |

ORIS L. RADER, Primary Examiner

A. G. COLLINS, Assistant Examiner

U.S. Cl. X.R.

318—341